US 8,699,378 B2

(12) United States Patent
Kormann et al.

(10) Patent No.: US 8,699,378 B2
(45) Date of Patent: Apr. 15, 2014

(54) METHODS AND APPARATUS FOR DISCOVERING HOSTS ON AN IPV6 NETWORK

(75) Inventors: David Kormann, Morristown, NJ (US); William Cheswick, Bernardeville, NJ (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 342 days.

(21) Appl. No.: 12/571,280

(22) Filed: Sep. 30, 2009

(65) Prior Publication Data

US 2011/0075590 A1 Mar. 31, 2011

(51) Int. Cl.
*H04L 12/28* (2006.01)
(52) U.S. Cl.
USPC .......................................... 370/254; 370/396
(58) Field of Classification Search
USPC ................... 370/254, 328, 329, 395.54, 396
See application file for complete search history.

(56) References Cited

U.S. PATENT DOCUMENTS

| | | | | |
|---|---|---|---|---|
| 6,101,499 | A * | 8/2000 | Ford et al. ............................. 1/1 |
| 6,118,784 | A * | 9/2000 | Tsuchiya et al. ............... 370/401 |
| 6,286,104 | B1 * | 9/2001 | Buhle et al. ........................ 726/4 |
| 6,532,217 | B1 * | 3/2003 | Alkhatib et al. ............... 370/252 |
| 6,574,664 | B1 * | 6/2003 | Liu et al. ........................ 709/224 |
| 6,687,755 | B1 * | 2/2004 | Ford et al. ...................... 709/245 |
| 6,961,336 | B2 * | 11/2005 | Coggeshall ................... 370/389 |
| 7,155,500 | B2 * | 12/2006 | Nikander ...................... 709/223 |
| 7,165,722 | B2 * | 1/2007 | Shafer et al. .................. 235/385 |
| 7,370,093 | B2 * | 5/2008 | Ohara ........................... 709/220 |
| 7,409,544 | B2 * | 8/2008 | Aura ............................. 713/162 |
| 7,443,862 | B2 * | 10/2008 | Nishio ...................... 370/395.54 |
| 7,483,379 | B2 * | 1/2009 | Kan et al. ...................... 370/237 |
| 7,653,044 | B1 * | 1/2010 | Arad .............................. 370/351 |
| 7,675,861 | B2 * | 3/2010 | Metzger et al. ............... 370/241 |
| 7,734,745 | B2 * | 6/2010 | Gloe .............................. 709/223 |
| 7,738,882 | B2 * | 6/2010 | Dutta et al. ................. 455/456.1 |
| 7,869,382 | B2 * | 1/2011 | Hamedi et al. ................ 370/254 |
| 7,933,273 | B2 * | 4/2011 | Takeda et al. ................. 370/400 |
| 7,957,382 | B1 * | 6/2011 | Somasundaram et al. ..... 370/392 |
| 8,045,558 | B2 * | 10/2011 | Droms et al. ................. 370/392 |
| 8,265,059 | B1 * | 9/2012 | Arad .............................. 370/351 |

(Continued)

OTHER PUBLICATIONS

US Air Force, "D—Internet Protocol Version 6 (IPv6) discovery and assessment tools," retrieved from https://www.fbo.gov/index?s=opportunity&mode=form&id=8d430b4ad48934534ed7e66ba7e11b48&tab=core&_cview=0, posted Dec. 10, 2007, 4 pages.

*Primary Examiner* — Brian O'Connor
(74) *Attorney, Agent, or Firm* — Hanley, Flight & Zimmermann, LLC

(57) ABSTRACT

Methods and apparatus for discovering hosts on an Internet Protocol (IP) version 6 (IPv6) network are disclosed. An example implementation includes probing a network to determine an Internet Protocol (IP) version 4 (IPv4) address that is in use on the network; determining a Media Access Control (MAC) address associated with the IPv4 address; determining a local-prefix; determining a first IP version 6 (IPv6) address, the first IPv6 address including the MAC address and the local-prefix; determining a second IPv6 address, the second IPv6 address including the MAC address and the local-prefix and the second IPv6 address being different than the first IPv6 address; probing the network to determine if the first IPv6 address is in use; probing the network to determine if the second IPv6 address is in use; and storing an indication of whether at least one of the first or second IPv6 address is in use.

19 Claims, 5 Drawing Sheets

(56) References Cited

U.S. PATENT DOCUMENTS

2006/0239201 A1* 10/2006 Metzger et al. ............... 370/252
2008/0212609 A1   9/2008 Yoshimoto et al.
2010/0191577 A1*  7/2010 Lu et al. .......................... 705/10
2010/0191723 A1*  7/2010 Perez et al. .................... 707/723

\* cited by examiner

METHODS AND APPARATUS FOR DISCOVERING HOSTS ON AN IPV6 NETWORK

TECHNICAL FIELD

The present disclosure pertains to packet based networks and, more specifically to, methods and apparatus for discovering hosts on an IPv6 network.

BACKGROUND

In order to accurately determine network usage statistics, network administrators use methods such as host discovery. Host discovery can be performed manually or in an automated fashion. Automated methods are often used when large address spaces are present. A method of host discovery on an Internet Protocol (IP) network might include sending a short message to every potential host address on a network, and then waiting for a response. Such a message generally takes the form of an Internet Control Message Protocol (ICMP) ping.

Typical Ethernet network devices have an associated Media Access Control (MAC) address, which functions as a serial number for the network interface of the network device. MAC addresses are assigned to network interfaces at the time of manufacture or in some cases, can be programmed into the network interface at a later time. Devices on a network are each assigned an IP address, so that they can be uniquely identified in the same address space as other devices on the network. IP address assignment is typically performed by a Dynamic Host Configuration Protocol (DHCP) server. Internet Protocol Version 4 (IPv4) is the protocol currently used in most networks and allows for a maximum of $2^{32}$ ($4.3 \times 10^9$) usable addresses. A method of expanding the address space is to use a private subnet, which allows private addresses to be distributed on a local area network (LAN) and publicly associated with a single IP address on a public network.

Internet Protocol Version 6 (IPv6) supports $2^{128}$ ($3.4 \times 10^{38}$) addresses. Because of the length of the IPv6 address, device specific identifiers such as a MAC address may be included in the IPv6 address. Additionally, network specific identifiers such as a local-prefix may be included in the IPv6 address. Because of the significantly larger address space, many more addresses may be used on a network. Currently, many systems that employ IPv6 addresses continue to use IPv4 addresses. This is known as a dual stack environment, wherein both IPv4 addresses and IPv6 addresses are assigned to devices.

DETAILED DESCRIPTION

Example methods and apparatus disclosed herein enable the discovery of hosts on an IPv6 network. In an example method, a network discovery host may discover IPv4 capable hosts on a network. Properties related to the discovered IPv4 hosts are then determined by consulting network resources. Additionally, the network discovery host may determine naming conventions of the network. The determined values are then used to generate a reduced list of probable IPv6 addresses, which are then probed to determine if a device is active for the particular address.

The disclosed example methods, apparatus and articles of manufacture are advantageous in several respects. For example, in traditional IPv4 host discovery, an exhaustive search is typically used to determine active IPv4 hosts on a network. An exhaustive search may comprise searching every IPv4 address for a given network. The network may be broken down into smaller subnets wherein the exhaustive search checks every IPv4 within the given subnet. The amount of time taken to perform an exhaustive search depends on how large of a subnet is being searched. For example, it may take 15 minutes to exhaustively search all IPv4 addresses. However, due to the larger address size of IPv6, an exhaustive search of all IPv6 addresses would take years to complete. The disclosed examples are able to perform a search in a much more useful time frame.

Figure 1:
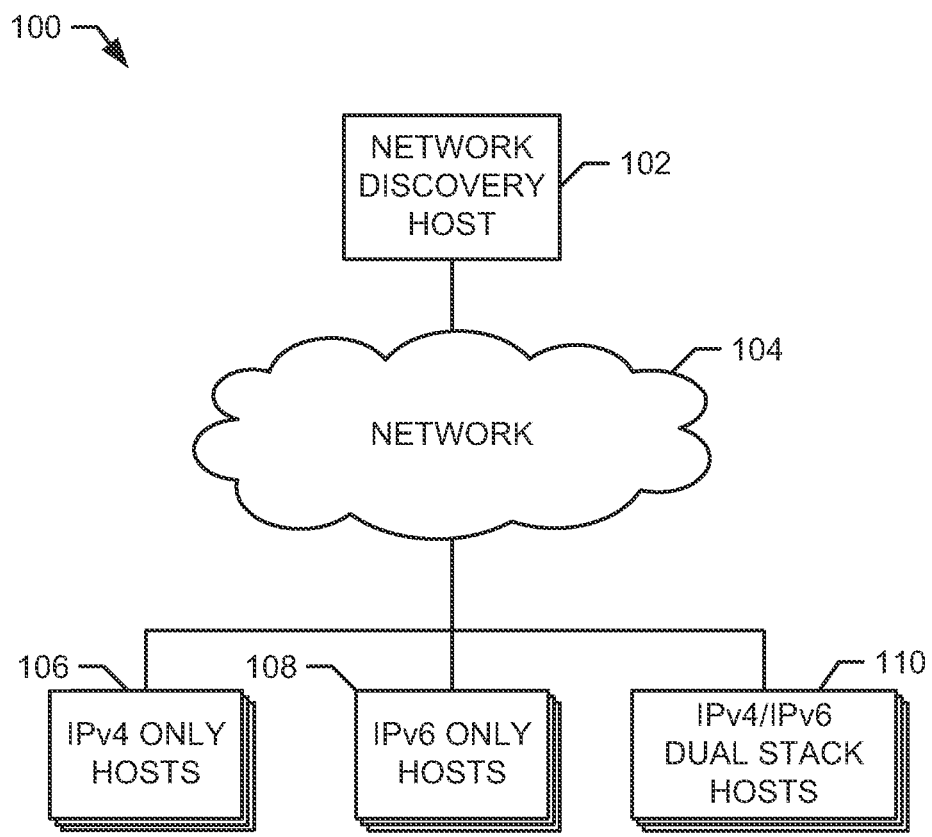
FIG. 1 is a block diagram of an example system for host discovery.

FIG. 1 is a block diagram of an example system 100 for host discovery. The example host discovery system 100 comprises a network discovery host 102, a network 104, a group of IPv4-only hosts 106, a group of IPv6-only hosts 108, and a group of IPv4 and IPv6 dual stack hosts 110. The network discovery host 102 communicates with the network 104 and hosts 106, 108, and 110 on the network 104 to discover active IPv6 addresses on the network 104 (e.g., IP addresses assigned to one or more of the hosts 106, 108, and 110). The network discovery host 102 could be any host capable of communicating on the network 104.

The network 104 is a dual stack network capable of supporting both IPv4 and IPv6 hosts. The example network 104 of FIG. 1 is implemented by an Institute of Electrical and Electronics Engineers (IEEE) 802.3 Ethernet network, however any networking medium may be used (e.g., an IEEE 802.11x wireless network, a Bluetooth communication network, a cellular network, etc.). The network 104 may comprise multiple networking mediums. For example, an IEEE 802.3 Ethernet network may be used in combination with an IEEE 802.11x wireless network.

The network hosts 106, 108, and 110 are hosts present on the network 104. Any number of the hosts 106, 108, and/or 110 may be implemented in the system 100. By way of example, not limitation, there may be 10 IPv4-only hosts 106, no IPv6-only hosts 108, and 15 dual stack hosts present on the network 104. Any other combination is likewise possible. The IPv4-only hosts 106 may be any type of hosts capable of being addressed on the network using only IPv4. The IPv6-only hosts 108 may be any type of hosts capable of being addressed on the network using only IPv6.

The dual stack hosts 110 may be any type of hosts on the network capable of being addressed on the network using both IPv4 and IPv6. These hosts 110 are issued both an IPv4 address and an IPv6 address. The dual stack hosts 110 may be contacted via IPv4, IPv6, or both IPv4 and IPv6. The dual stack hosts 110 may arise due to legacy support for IPv4 in a system that supports IPv6 or in any system where dual stack support is implemented.

Figure 2:
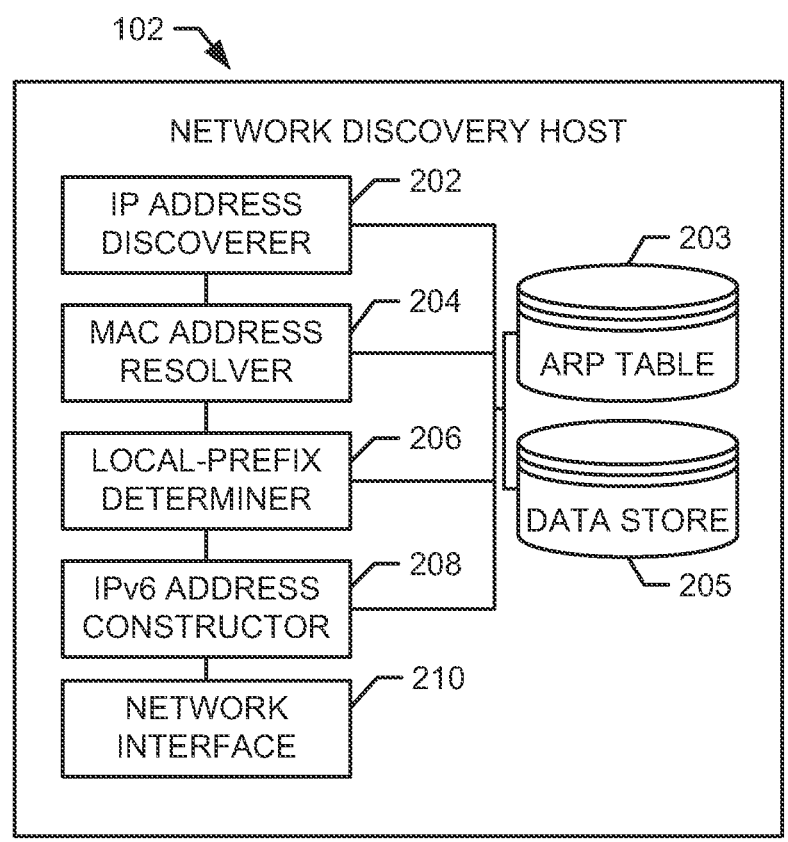
FIG. 2 is a block diagram of the example network discovery host of FIG. 1.

FIG. 2 is a block diagram of an example implementation of the network discovery host 102 of FIG. 1. The example network discovery host 102 of FIG. 2 comprises an IP address discoverer 202, an Address Resolution Protocol (ARP) table 203, a MAC address resolver 204, a data store 205, a local-prefix determiner 206, an IPv6 address constructor 208, and a network interface 210. The IP address discoverer 202 sends requests to other hosts on the network 104 in order to discover remote hosts present on the network. The IP address discoverer 202 is capable of sending requests via both IPv4 and IPv6. The requests sent by the IP address discoverer 202 are formatted as ICMP pings for discovering IPv4 hosts. Additionally, requests sent by the IP address discoverer 202 are formatted as Internet Control Message Protocol Version 6 (ICMPv6) pings for discovering IPv6 hosts. Any alternative address discovery method may be utilized by the IP address discoverer 202.

The MAC address resolver 204 resolves MAC addresses 306 associated with discovered IPv4-only hosts 106 and dual stack hosts 110. MAC address resolution is performed by querying the ARP table 203 with the IPv4 address for which the MAC address is to be determined. Additionally, the ARP table 203 may not be local to the network discovery host 102. Alternatively, other methods of MAC address resolution may be used such as, for example, consulting records of a DHCP server on the network 104. MAC addresses are then stored in the data store 205.

The data store 205 may be any type of data store. In the example implementation shown in FIG. 2, the data store is a database on a mass storage device 530 (see FIG. 5). The database may be any type of database such as, for example, a flat file database (e.g., a Comma Separated Value (CSV) file, a relational database (e.g., SQL), etc.). The information stored in the data store 205 may be any information used by components of the network discovery host 102 such as, for example, a list of discovered IPv4 addresses, a list of resolved MAC addresses, a list of local-prefixes, a list of potential IPv6 addresses, a list of discovered IPv6 addresses, etc.

The local-prefix determiner 206 determines a local-prefix 302 for the network 104. The local-prefix is a network specific value which describes the addressing scheme of the network (e.g., 10FA:6604:8136:6502::/64). This local-prefix is occasionally broadcast by hosts on the network. The local-prefix determiner 206 of the illustrated example accomplishes local-prefix determination by monitoring the network for IPv6 prefix advertisement messages. Alternatively, the link-local-prefix may be used as the local-prefix. The link-local-prefix is a local-prefix defined by the IPv6 protocol that is valid only for the local physical link (e.g., fe80::/10). The local physical link may be the network interface 210 that is local to the network discovery host 102. Further, the local-prefix determiner 206 may use a preconfigured value as the local-prefix. This may be advantageous in situations where prefix advertisement is disabled on the network or where prefix advertisement monitoring has been disabled on the local-prefix determiner 206.

The IPv6 address constructor 208 of the illustrated example utilizes the resolved MAC addresses as well as the local-prefix to construct potential IPv6 addresses for IPv6-only hosts 108 and 110 on the network 104. Additionally, as described in further detail in conjunction with FIG. 3, the IPv6 address constructor 208 may derive an intermediate value 304 to supplement the MAC address 306 and local-prefix 302 in constructing an IPv6 address 300. The example IPv6 constructor 208 generates multiple IPv6 addresses to be analyzed by the IP address discoverer 202.

The network interface 210 allows the network discovery host 102 to communicate with the network 104. In the illustrated example, an IEEE 802.3 wired Ethernet network may be used. However, any alternative network interface may additionally or alternatively be used such as, for example, an IEEE 802.11x wireless network, a 802.15 ZigBee wireless network, etc. Regardless of the type of network interface 210 that is utilized in the network discovery host 102, the network interface enables communication with the network 104, and remote hosts 106, 108, and 110 on the network 104.

The constructed IPv6 addresses 300 are probed by the IP address discoverer 202, by means of the network interface 210. Such probing may be implemented by sending an ICMPv6 ping. If a response to the ICMPv6 ping is received, the constructed IPv6 address 300 is recorded in the data store 205 as active. If a response to the ICMPv6 ping is not received, the constructed IPv6 address 300 is recorded in the data store 205 as inactive. Additionally, the IP address discoverer 202 may, upon receiving a response to an ICMPv6 ping, remove IPv6 addresses 300 constructed from the same MAC address from the probed IPv6 address 300. Although the foregoing description provides examples in the context of IPv4 and IPv6, the teachings of this disclosure are not limited to those protocols, but instead can be applied to analogous situations in other past, present or future protocols.

Figure 3:
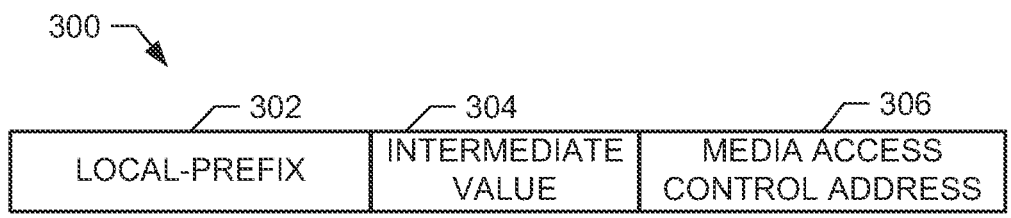
FIG. 3 is a diagram of an example constructed IPv6 address.

FIG. 3 is a block diagram of an example IPv6 address 300 that may be constructed by the IPv6 address constructor 208. The example IPv6 address 300 contains the local-prefix 302, the intermediate value 304, and the MAC address 306. The example IPv6 address 300 has a binary length of 128 bits. However, an address having any length (e.g., addresses in accordance with future generations of protocols) may be determined and analyzed as described herein.

The IPv6 address 300 constructed by the IPv6 address constructor 208 is considered a potential IPv6 host on the network 104. At the time the IPv6 address is constructed, the constructed IPv6 address 300 has not yet been confirmed as the address of an IPv6-only host 108 and/or a dual stack host 110 on the network 104. Instead, the constructed IPv6 address 300 is a candidate address for such a host. The example IPv6 address 300 of FIG. 3 begins with the local-prefix 302. The local-prefix 302 of the illustrated example is determined by the local-prefix determiner 206 as explained above. The example IPv6 address 300 ends with the MAC address 306. The MAC address of the illustrated example 306 is determined by the MAC address resolver 204 as explained above. The example intermediate value 304 is initially an undetermined portion of the potential IPv6 addresses on the network 104. The example MAC address 306 has a fixed length of 48 bits, while the example local-prefix 302 has a variable bit length. Accordingly, the remaining bits of the IPv6 address 300 (e.g., those bits not used by the local-prefix and/or the MAC address) are available for use by the intermediate value 304. To identify all possible IPv6 addresses for analysis, all potential values for the intermediate value 304 are used to construct candidate IPv6 addresses 300. Additionally or alternatively, specific types of intermediate values may be used such as, for example, an IEEE 64-bit extended unique identifier (EUI-64). The candidate addresses are then probed to determine if they are in fact in use by an IPv6 host. Every unique intermediate value will result in an additional IPv6 address which must be probed. Using many variations of the intermediate value 304 results in a large number of candidate IPv6 addresses. However, the number of candidate addresses is significantly smaller than the total number of IPv6 addresses.

While an example manner of implementing the network discovery host has been illustrated in FIGS. 1 and 2, one or more of the elements, processes and/or devices illustrated in FIGS. 1 and 2 may be combined, divided, re-arranged, omitted, eliminated and/or implemented in any other way. Further, the example IP address discoverer 202, the ARP table 203, the MAC address resolver 204, the data store 205, the local-prefix determiner 206, the IPv6 address constructor 208, the network interface 210 and/or, more generally, the example network discovery host 102 of FIG. 1 or 2 may be implemented by hardware, software, firmware and/or any combination of hardware, software and/or firmware. Thus, for example, any of the example IP address discoverer 202, the ARP table 203, the MAC address resolver 204, the data store 205, the local-prefix determiner 206, the IPv6 address constructor 208, the network interface 210 and/or, more generally, the example network discovery host 102 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software and/or firmware implementation, at least one of the example network discovery host 102, the IP address discoverer 202, the ARP table 203, the MAC address resolver 204, the data store 205, the local-prefix determiner 206, the IPv6 address constructor 208, and/or the network interface 210 are hereby expressly defined to include a tangible medium such as a memory, DVD, CD, etc. storing the software and/or firmware. Further still, the example network discovery host 102 of FIGS. 1 and/or 2 may include one or more elements, processes and/or devices in addition to, or instead of, those illustrated in FIG. 2, and/or may include more than one of any or all of the illustrated elements, processes and devices.

Figure 4:
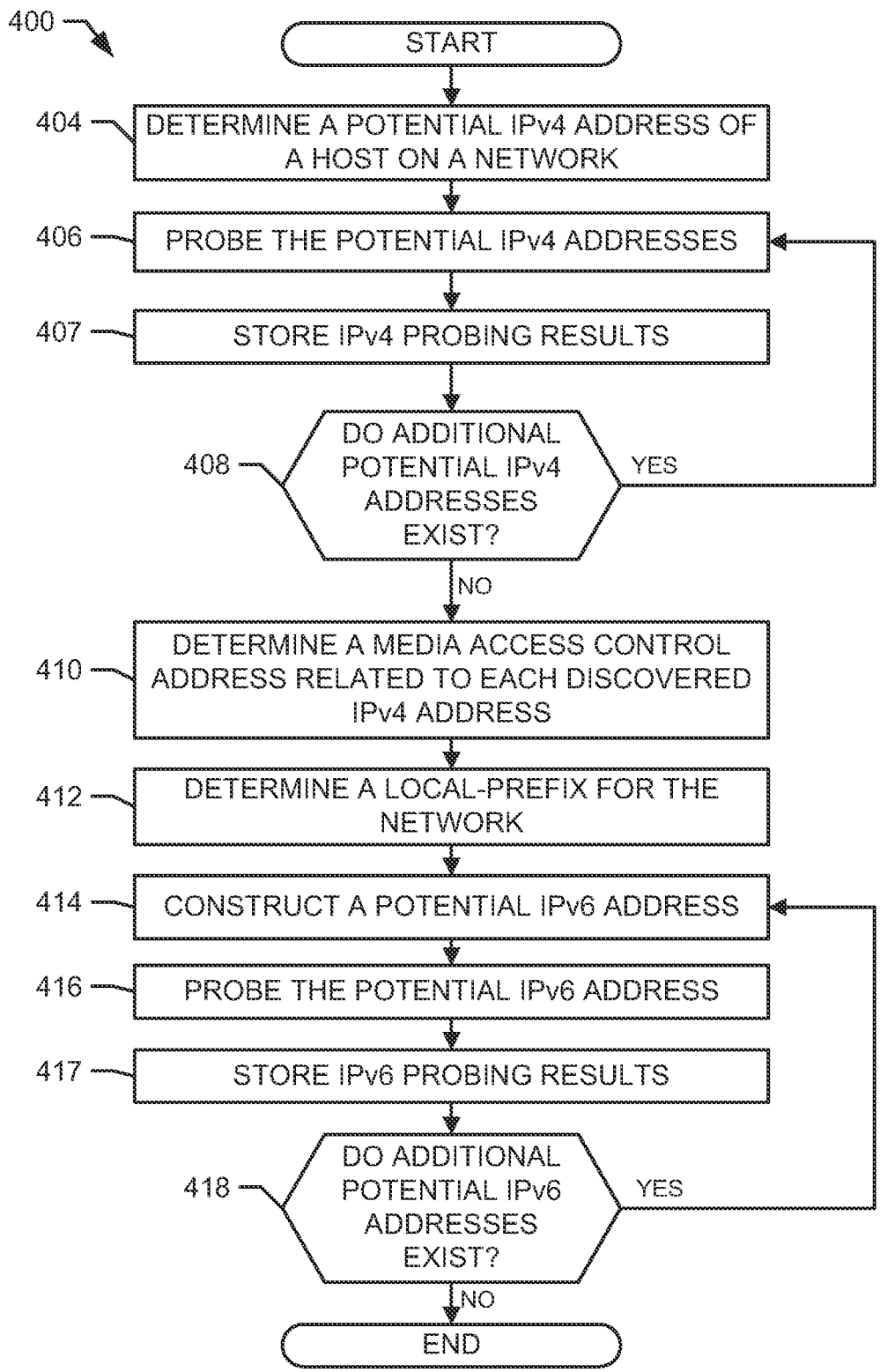
FIG. 4 is a flowchart representative of example machine readable instructions that may be executed to implement the network discovery host of FIGS. 1 and 2.

FIG. 4 is a flowchart representative of example machine readable instructions 400 which may be executed to implement the example network discovery host 102 of FIGS. 1 and 2. In these examples, the machine readable instructions represented by FIG. 4 may comprise one or more programs for execution by: (a) a processor, such as the processor 512 shown in the example computer 500 discussed below in connection with FIG. 5, (b) a controller, and/or (c) any other suitable device. The one or more programs may be embodied in software stored on a tangible medium such as, for example, a flash memory, a CD-ROM, a floppy disk, a hard drive, a DVD, or a memory associated with the processor 512, but the entire program or programs and/or portions thereof could alternatively be executed by a device other than the processor 512 and/or embodied in firmware or dedicated hardware (e.g., implemented by an application specific integrated circuit (ASIC), a programmable logic device (PLD), a field programmable logic device (FPLD), discreet logic, etc.). For example, any or all of the machine readable instructions represented by the flowchart of FIG. 4 could be implemented by any combination of software, hardware, and/or firmware. Also, some or all of the machine readable instructions represented by the flowchart of FIG. 4 may be implemented manually. Further, although the example machine readable instructions are described with reference to the flowchart illustrated in FIG. 4, many other techniques for implementing the example methods and apparatus described herein may alternatively be used. For example, with reference to the flowchart illustrated in FIG. 4, the order of execution of the blocks may be changed, and/or some of the blocks described may be changed, eliminated, combined and/or subdivided into multiple blocks.

Figure 5:
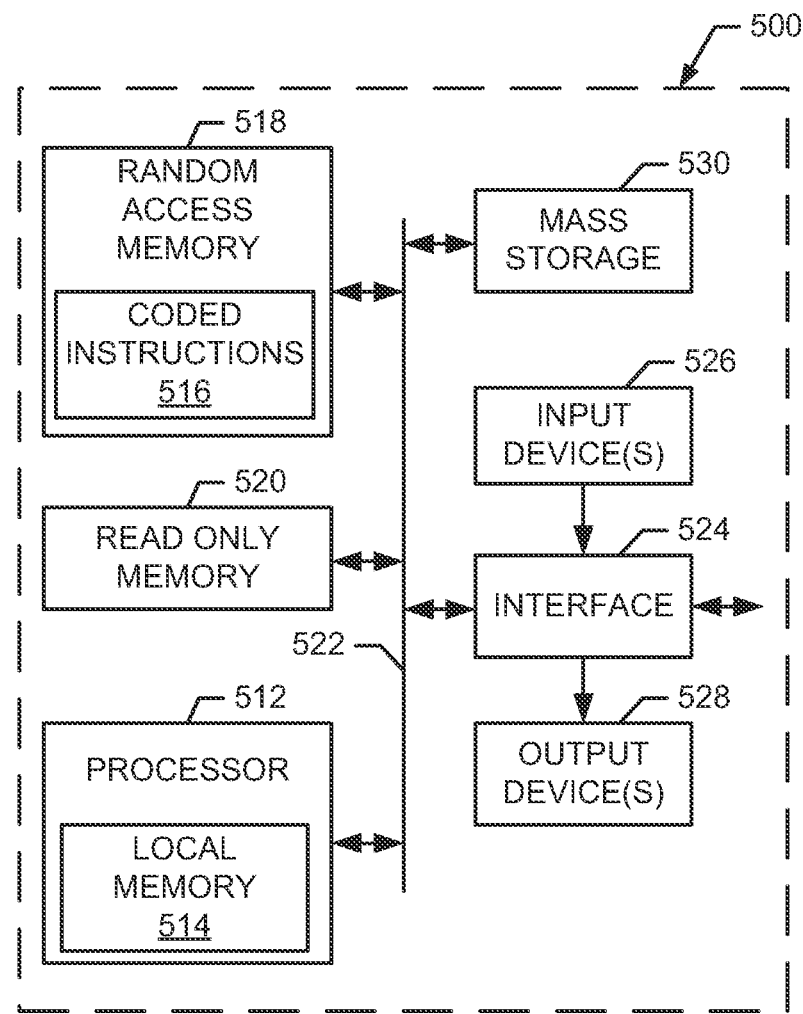
FIG. 5 is a block diagram of an example processor system that may be used to execute the instructions of FIG. 4 to implement the example methods and apparatus described herein.

The illustrated process 400 is embodied in one or more software or firmware programs which are stored in one or more memories (e.g., the random access memory 518 and/or the mass storage 530 of FIG. 5) and executed by one or more processors (e.g., the processor 512 of FIG. 5). However, some or all of the blocks of the process 400 may be performed manually and/or by some other device. Although the process 400 is described with reference to the flowchart illustrated in FIG. 4, many other methods of performing the process 400 may be used. For example, the order of the blocks may be altered, the operation of one or more blocks may be changed, blocks may be combined, and/or blocks may be eliminated.

The example process 400 begins when an operator instructs the network discovery host 102 to discover IPv6 hosts on the network 104. Alternatively, the example process 400 may begin in an automated fashion such as, for example, upon occurrence of a scheduled time or event, or at a defined time interval (e.g., once a day, twice a day, etc.). The example IP address discoverer 202 determines a potential IPv4 address of a remote IPv4-only host 106 or dual stack host 110 on the network 104 (block 404). For example, the potential IPv4 address may be determined by selecting an IPv4 address from a range of IPv4 addresses. The range of IPv4 addresses may be entered manually by a user or may be determined automatically by the network discovery host 102. The IPv4 addresses may be obtained from a database of addresses or generated in a non-random or pseudo-random fashion. The IP address discoverer 202 probes the IPv4 address to determine if either an IPv4-only host 106 or dual stack host 110 is present at the address (block 406). In the illustrated example, the IP address discoverer 202 probes the network 104 for a host at a given IPv4 address by sending an ICMP ping addressed to the IPv4 address to be probed via the network interface 210 and waiting for a response. The results of such probing are stored in the data store 205 (block 407). If a response is received within a given timeframe, the IP address discoverer 202 records the IPv4 address as active in the data store 205. If a response is not received within a given timeframe, the IP address discoverer 202 records the IPv4 address as inactive in the data store 205.

After the state of the IPv4 address has been stored (block 407), the IP discoverer 202 of the network discovery host 102 determines if there are additional IPv4 addresses which require probing (block 408). Additional potential IPv4 addresses will exist when addresses in the range of potential addresses have not yet been probed. If additional IPv4 addresses exist, control returns to block 406 to probe the next address.

If additional potential IPv4 addresses do not exist (e.g., the range of potential IPv4 addresses has been exhausted) (block 408), the MAC address resolver 204 of the network discovery host 102 determines the MAC address 306 associated with each discovered IPv4 address (block 410). Determining the MAC address 306 associated with each discovered IPv4 address can be implemented in many ways. In the illustrated example, the MAC address resolver 204 determines the MAC address 306 associated with each discovered IPv4 address by consulting an ARP table. In the example of FIG. 2. the ARP table 203 is local to the network discovery host 102. The local-prefix determiner 206 then determines the local-prefix 302 for the network 104 (block 412). In the illustrated example, the local-prefix determiner 206 determines the local-prefix 302 for the network 104 by monitoring the network for IPv6 prefix advertisement messages. However, alternative implementations may be used for determining the local-prefix 302 such as, for example, using a link-local-prefix. The local-prefix determiner 206 may determine the local-prefix 302 before determining a potential IPv4 address of a host on the network 104. Alternatively, determining the local-prefix 302 may be performed in parallel with blocks 404 through 410.

After the local-prefix determiner 206 of the network discovery host 102 has determined the local-prefix 302 (block 412) and the MAC address resolver 204 has determined a MAC address 306 associated with each discovered IPv4 address (block 410), the example IPv6 address constructor 208 constructs a potential IPv6 address 300 (block 414). The potential IPv6 address 300 of the illustrated example is constructed as shown and described in connection with FIG. 3. After constructing the potential IPv6 address 300, the IP address discoverer 202 of the network discovery host 102 probes the potential IPv6 address 300 (block 416). In the illustrated example, the IP address discoverer 202 probes the network 104 for the host with the IPv6 address by sending an ICMPv6 ping via the network interface 210 and waiting for a response. If a response is received within a given timeframe, the IPv6 address is recorded as active in the data store 205 (block 417). If a response is not received within a given timeframe, the IPv6 address is recorded as inactive in the data store 205 (block 417). After the state of the IPv6 address has been stored (block 417), the IP address discoverer 202 proceeds to determine if there are additional IPv6 addresses 300 which should be probed (block 418). Alternatively, if it is determined that a particular IPv6 address 300 is active in block 416, the IP address discoverer 202 may first remove the IPv6 addresses 300 constructed based on the same MAC address 306 from the list of potential IPv6 addresses in order to expedite further probing. If additional IPv6 addresses exist (e.g., IPv6 addresses 300 constructed using the same or different MAC address as the previously probed IPv6 address 300), control returns to block 414 to probe the additional IPv6 addresses 300. If additional potential IPv6 address do not exist (e.g., all potential constructed IPv6 addresses have been exhausted), the process 400 terminates.

FIG. 5 is a block diagram of an example computer 500 capable of executing the example instructions of FIG. 4 to implement the apparatus and methods disclosed herein. The computer 500 can be, for example, a server, a personal computer, a personal digital assistant (PDA), an internet appliance, or any other type of computing device.

The system 500 of the instant example includes a processor 512 such as a general purpose programmable processor. The processor 512 includes a local memory 514, and executes coded instructions 516 present in the local memory 514 and/or in another memory device. The processor 512 may execute, among other things, the machine readable instructions represented in FIG. 4 which may be represented by the coded instructions 516. The processor 512 may be any type of processing unit, such as one or more microprocessors from the Intel® Centrino® family of microprocessors, the Intel® Pentium® family of microprocessors, the Intel® Itanium® family of microprocessors, and/or the Intel XScale® family of processors. Of course, other processors from other families are also appropriate.

The processor 512 is in communication with a main memory including a volatile memory 518 and a non-volatile memory 520 via a bus 522. The volatile memory 518 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 520 may be implemented by flash memory and/or any other desired type of memory device. Access to the main memory 518, 520 is typically controlled by a memory controller (not shown).

The computer 500 also includes an interface circuit 524. The interface circuit 524 may be implemented by any type of interface standard, such as an Ethernet interface, a universal serial bus (USB), and/or a third generation input/output (3GIO) interface.

One or more input devices 526 are connected to the interface circuit 524. The input device(s) 526 permit a user to enter data and commands into the processor 512. The input device(s) can be implemented by, for example, a keyboard, a mouse, a touchscreen, a track-pad, a trackball, an isopoint and/or a voice recognition system.

One or more output devices 528 are also connected to the interface circuit 524. The output devices 528 can be implemented, for example, by display devices (e.g., a liquid crystal display, a cathode ray tube display (CRT)), by a printer and/or by speakers. The interface circuit 524, thus, typically includes a graphics driver card.

The interface circuit 524 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The computer 500 also includes one or more mass storage devices 530 for storing software and data. Examples of such mass storage devices 530 include floppy disk drives, hard drive disks, compact disk drives and digital versatile disk (DVD) drives. The mass storage device 530 may implement the example data store 205. Alternatively, the volatile memory 518 may implement the example data store 205.

As an alternative to implementing the methods and/or apparatus described herein in a system such as the device of FIG. 5, the methods and or apparatus described herein may be embedded in a structure such as a processor and/or an ASIC (application specific integrated circuit).

Although the above discloses example systems including, among other components, software executed on hardware, it should be noted that such systems are merely illustrative and should not be considered as limiting. For example, it is contemplated that any or all of the disclosed hardware and software components could be embodied exclusively in dedicated hardware, exclusively in software, exclusively in firmware or in some combination of hardware, firmware and/or software.

In addition, although certain methods, apparatus, and articles of manufacture have been described herein, the scope of coverage of this patent is not limited thereto. On the contrary, this patent covers all apparatus, methods and articles of manufacture fairly falling within the scope of the appended claims either literally or under the doctrine of equivalents.

What is claimed is:

1. A method for discovering network hosts, the method comprising:
    probing a network to determine an Internet Protocol (IP) version 4 (IPv4) address that is in use on the network;
    determining a Media Access Control (MAC) address associated with the IPv4 address;
    determining a local-prefix;
    determining, with a processor, a first IP version 6 (IPv6) address, the first IPv6 address including the local-prefix followed by a first intermediate value followed by the MAC address;
    determining, with the processor, a second IPv6 address, the second IPv6 address including the local prefix, a second intermediate value different than the first intermediate value, and the MAC address;
    probing the network to determine if the first IPv6 address is in use; and
    probing the network to determine if the second IPv6 address is in use.

2. The method as described in claim 1, wherein probing the network to determine an IPv4 address that is in use on the network comprises sending an Internet Control Message Protocol (ICMP) message.

3. The method as described in claim 1, wherein determining the MAC address associated with the IPv4 address comprises accessing an Address Resolution Protocol (ARP) table.

4. The method as described in claim 1, wherein determining a local-prefix comprises monitoring the network for an IPv6 prefix advertisement message.

5. The method as described in claim 1, wherein determining a local-prefix comprises determining a link-local-prefix for a local physical link.

6. The method as described in claim 1, wherein the intermediate value has a length of 128 bits minus a first number of bits to represent the local-prefix and minus a second number of bits to represent the MAC address.

7. The method as described in claim 6, further comprising constructing a list of IPv6 addresses having all possible values of the intermediate value.

8. The method as described in claim 1, wherein probing the network to determine if the first IPv6 address is in use comprises sending an ICMP version 6 (ICMPv6) ping and waiting for a response.

9. The method as described in claim 1, wherein probing the network to determine if the second IPv6 address is in use comprises sending an ICMP version 6 (ICMPv6) ping and waiting for a response.

10. The method as described in claim 1, further comprising storing, in a storage, an indication of whether at least one of the first or second IPv6 address is in use.

11. An apparatus for discovering hosts on a network, the apparatus comprising:
   an IP address discoverer to discover a first IP address using a first IP protocol version that is in use on the network;
   a MAC address resolver to resolve a MAC address for the discovered first IP address;
   a local-prefix determiner to determine a local-prefix;
   an address constructor to construct second and third IP addresses using a second IP protocol version, the second IP address including the local-prefix followed by a first intermediate value followed by the MAC address, the third IP address including the local-prefix, a second intermediate value different than the first intermediate value, and the MAC address; and
   a network interface, wherein the IP address discoverer is to determine if the second and third IP addresses are in use in the network.

12. The apparatus as described in claim 11, wherein the IP address discoverer is to discover the first IP address that is in use on the network by sending an ICMP ping, and waiting for a response.

13. The apparatus as described in claim 11, wherein the MAC address resolver is to resolve the MAC address associated with the discovered first IP address by consulting an ARP table.

14. The apparatus as described in claim 11, wherein the local-prefix determiner is to monitor the network for a prefix advertisement message for the second IP protocol version addresses.

15. The apparatus as described in claim 11, wherein the local-prefix determiner is to determine the local-prefix as a link local-prefix for a local physical link.

16. The apparatus as described in claim 11, wherein the first intermediate value has a length of 128 bits minus a first number of bits to represent the local-prefix and minus a second number of bits to represent the MAC address.

17. The apparatus as described in claim 11, wherein the second and third IP addresses are constructed using all possible values of the first intermediate value and the second intermediate value.

18. The apparatus as described in claim 11, wherein the IP discoverer is to determine if the second IP address is in use on the network by sending an ICMP ping, and waiting for a response.

19. A tangible computer readable storage device comprising instructions which, when executed, cause a machine to perform a method comprising:
   probing a network to determine a first IP address of a first IP protocol version that is in use on the network;
   determining a Media Access Control (MAC) address associated with the first IP address;
   determining a local-prefix;
   determining a second address of a second IP protocol version, the second address of the second IP protocol version including the local prefix followed by a first intermediate value followed by the MAC address;
   determining a third address of the second IP protocol version, the third address of the second IP protocol version including the MAC address, a second intermediate value different than the first intermediate value, and the local-prefix;
   probing the network to determine if the second address is in use; and
   probing the network to determine if the third address is in use.

* * * * *